Feb. 24, 1959

J. T. CORCORAN ET AL 2,875,237

PURIFICATION OF DIMETHYLTEREPHTHALATE

Filed June 7, 1957

INVENTORS:
James T. Corcoran
Kenneth C. Peterson
BY

*Michael Defiery*

ATTORNEY

United States Patent Office 2,875,237
Patented Feb. 24, 1959

2,875,237

PURIFICATION OF DIMETHYLTEREPHTHALATE

James T. Corcoran, Brownsville, Tex., and Kenneth C. Peterson, Chicago, Ill., assignors to Standard Oil Company, Chicago, Ill., a corporation of Indiana Application June 7, 1957, Serial No. 664,390

4 Claims. (Cl. 260—475)

This invention relates to the preparation of extremely high purity dimethylterephthalate from crude dimethylterephthalate.

The synthetic fiber industry utilizes dimethylterephthalate as an intermediate; for this purpose the dimethylterephthalate must be of extremely high purity as measured by the acid number and melting point of the material. It is desired that the dimethylterephthalate have an acid number as close to zero as possible and not in excess of about 0.05; the melting point desired is about 140.62° C. with a tolerance of about ±0.02° C.

Dimethylterephthalate is made by the reaction of methanol and terephthalic acid with or without the presence of a metallic cataylst. The reaction cannot be forced to complete conversion of the terephthalic acid. The crude dimethylterephthalate contains normally among other materials unreacted acid, mono-methylterephthalate, impurities which were present in the acid charged, and catalyst if this was used. It has been found that extremely high purity dimethylterephthalate can be produced by distillation of the crude ester but at relatively low yields.

An object of the invention is a process for preparing extremely high purity dimethylterephthalate in high yield. Another object of the invention is a process for purifying the crude dimethylterephthalate to produce dimethylterephthalate of extremely high purity in a simple procedure involving only physical separations. Other objects will become apparent in the course of the detailed description.

Figures 1, 2:
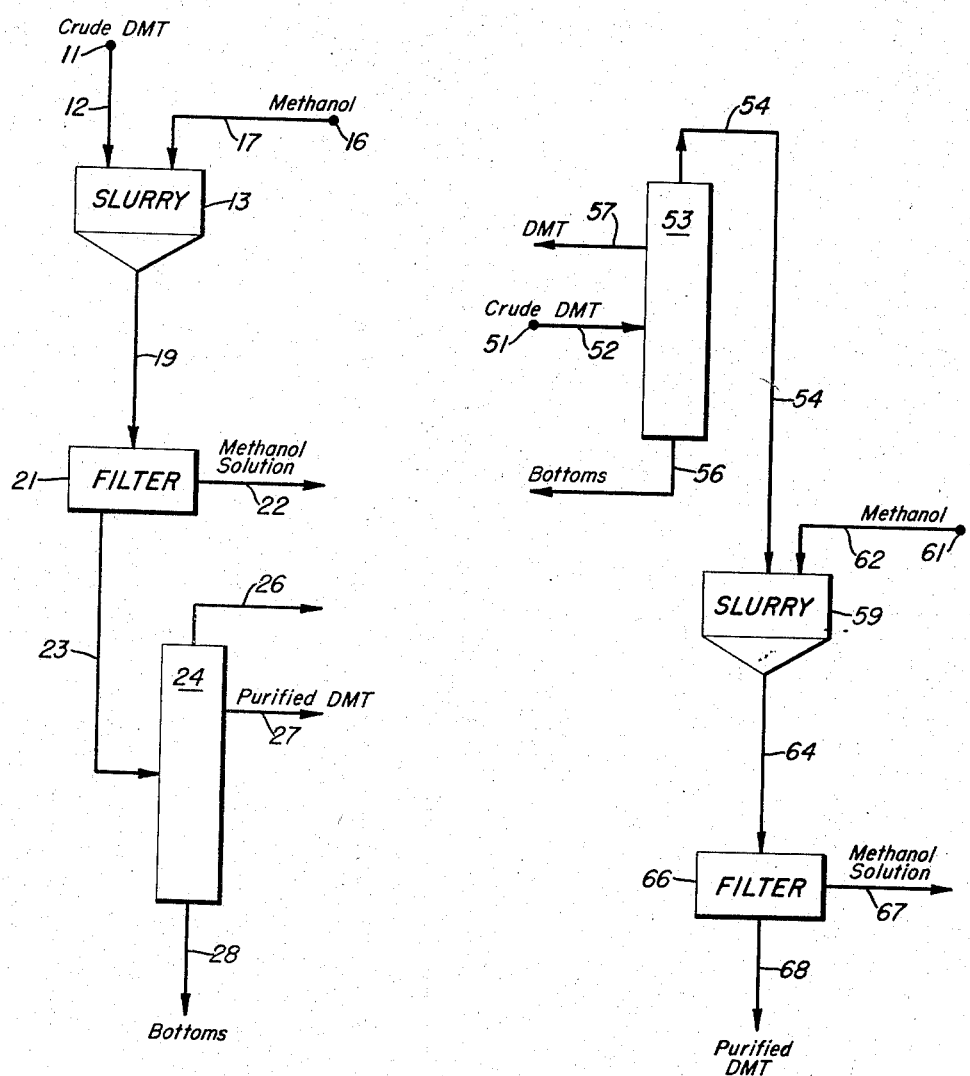
Figure 1 shows in block diagram one form of the instant invention wherein distillation is the final step in the purification process.
Figure 2 shows another embodiment of the invention wherein a distillation operation forms the first step in the purification process.

In Figure 1 there is set out in block form one embodiment of the process. In this embodiment the crude DMT from source 11 is passed by way of line 12 into vessel 13. The crude dimethylterephthalate which forms the charge to the instant process is characterized by an acid number (mg. KOH per g. of material) between 0.1 and about 50. It is usual for the crude dimethylterephthalate from the reaction which have proceeded to about equilibrium to have an acid number in the region of 2 to 20. The crude dimethylterephthalate (DMT) charge may be either that taken directly from the esterification operation or may be material which has been partially purified either by distillation or by a recrystallization from methanol procedure.

Liquid methanol from source 16 is passed by way of line 17 into vessel 13. The liquid methanol is preferably essentially anhydrous but may contain a small amount of water. The amount of liquid methanol charged to vessel 13 is sufficient to dissolve enough of the impurities present so that the DMT recovered from vessel 13 has an acid number lower than that of the crude DMT from source 11. The amount of methanol charged, however, is not enough to dissolve any substantial amount of DMT. In general, between about 1 and 10 parts by weight of liquid methanol are charged to vessel 13 per part of crude DMT charged to vessel 13. Vessel 13 is provided with agitation means such as a propeller, turbine or inert gas. When using inert gas agitation means are provided for recovering methanol stripped from vessel by the inert gas. The DMT and methanol form a slurry in vessel 13; the contacting of the liquid methanol and crude DMT is continued for a time such that the acid number of the contacted DMT is substantially reduced below that of the crude DMT. When the acid number of the crude DMT is in the region of 2–20 it is preferable to use between about 2 and 6 parts by weight of liquid methanol per part of the crude DMT.

The upper temperature of contacting in vessel 13 is below the boiling point of methanol at the particular pressure existing in vessel 13. Quite low temperatures may be used. In general, the slurry operation in vessel 13 is carried out at a temperature between about 10° C. and 60° C.; the higher temperatures usually will be used.

The time of contacting of the liquid methanol and crude DMT in vessel 13 partially determines the reduction in acid number obtained therein. While the temperature of contacting does somewhat decrease the minimum time needed in general, the amount of methanol used determines the minimum amount of contacting. It is desirable to use a time of at least about 5 minutes; contacting times of an hour or more may be used if desired.

The slurry from vessel 13 is passed by way of line 19 into filter zone 21. Filter zone 21 is adapted for removal of the liquid methanol solution from the contacted solid DMT. An ordinary suction filter or a centrifuge may be used. The liquid methanol solution comprising methanol charged and dissolved impurities from the crude DMT is withdrawn from filter zone 21 by way of line 22. The filtered solid DMT is passed by way of line 23 into distillation zone 24. Distillation zone 24 may be a batch operation or a continuous operation. In distillation zone 24 the filtered DMT is distilled to produce overhead a fraction which comprises DMT and impurities which is shown as being withdrawn by way of line 26. The material withdrawn by way of line 26 has an acid number greater than 0.05; in operation of a batch distillation the overhead product will be cut when the overhead reaches an acid number on the order of 0.05. The product purified DMT is then distilled until vapors either stop evolving or, in some cases, the acid number of the distillate increases above about 0.05. Purified DMT is shown as being withdrawn by way of line 27. A small amount of very high boiling material is withdrawn from zone 24 by way of line 28.

It is to be understood that the amount of methanol charged to vessel 13 will be determined in part by the acid number of the crude DMT charged. When it is desired to have a maximum recovery of purified DMT from distillation zone 24 the lower the acid number of the filtered DMT the more the amount of material produced as DMT.

Some of the material produced from the distillation zone and discarded through line 26 may be recycled to vessel 13 in order to recover some of the DMT content. Not all of this material may be recycled since there will be a build-up of impurities in the system.

*Example 1*

Crude dimethylterephthalate produced by catalytic esterification which had an acid number of 20 was charged to a vessel and slurried with 3 pounds of anhydrous methanol per pound of crude DMT. The slurrying operation was carried out at about 25° C. for a total time of 30 minutes using a propeller stirrer. The contacted DMT was recovered by suction filtration of the slurry and was freed of entrained methanol in a vacuum dryer. The yield of filtered DMT was 91% of the crude DMT and had an acid number of 13. The filtered DMT was charged to a batch distillation column having about 20 actual plates. The bottoms product represented about 3% of the charge to the column. Eighty-nine percent of the material taken overhead had an acid number of less than 0.05; the melting point of this DMT was 140.64. This purified DMT meets the requirements for synthetic fiber grade dimethylterephthalate.

In Figure 2 there is shown another embodiment of the purification process. In this embodiment crude dimethylterephthalate from source 51 is passed by way of line 52 into distillation zone 53, which zone is identical to zone 24. In this embodiment the crude DMT has a maximum acid number of about 25. In distillation zone 53 an overhead fraction containing most of the impurities is withdrawn by way of line 54. A bottoms product of material boiling above DMT is withdrawn by way of line 56. A DMT overhead fraction of extremely high purity is shown as being withdrawn by way of line 57.

The fraction containing the concentration of impure DMT is passed by way of line 54 into vessel 59 which is identical with vessel 13. Liquid methanol from source 61 is passed by way of line 62 into vessel 59. Here between about 2 and 10 parts by weight of liquid methanol are charged per part of said distilled crude DMT charged into vessel 59. The temperature in vessel 59 is maintained below the boiling point of methanol at the pressure utilized in vessel 59. Usually the pressure will be atmospheric and the temperature between about 10° C. and 60° C.; since purified DMT is to be produced without distillation vessel 59 is operated at temperatures in the region of the boiling point of methanol for example, 50–60° C.

The slurry is agitated in vessel 59 for a time such that the solid DMT recovered from the slurry has an acid number of not more than 0.05. In general, contacting times will be on the order of 10–60 minutes.

The slurry from vessel 59 is passed by way of line 64 into filter zone 66 which is identical with filter zone 21. The liquid methanol solution is withdrawn from zone 66 by way of line 67. Purified DMT which is of extremely high purity is withdrawn from zone 66 by way of line 68. The material from lines 57 and 68 may be blended to produce the final product. Particularly, when the amount of distilled impure DMT is small, the blending operation is most conveniently performed in distillation zone 53 by cycling the material from line 68 thereto. By this procedure only one stream of pure DMT is produced and this from line 57.

*Example 2*

In this example the crude DMT to be purified had an acid number of 8. The crude DMT was charged to a distillation column providing about 20 plates. Three percent of the material charged to the distillation was discarded as bottoms. Sixty-five percent of the crude DMT was recovered from the distillation zone as extremely high purity material having an acid number less than 0.05 and a melting point of 140.61° C. The distillate fraction having an acid number higher than 0.05 was slurred with 3 pounds of anhydrous methanol per pound of the distilled crude DMT; the slurrying operation was carried out at 60° C. for a time of 15 minutes. The slurry was cooled to room temperature and the solid DMT was recovered by suction filtration. The entrained liquid methanol solution was removed by vacuum drying. The yield of purified DMT from the slurrying operation was 97% of the distilled crude DMT. The purified DMT from the slurrying operation had an acid number of 0.02 and a melting point of 140.61° C.

Thus having described the invention, what is claimed is:

1. A process for preparing extremely high purity dimethylterephthalate from crude dimethylterephthalate having an acid number between 0.1 and about 50 which process comprises contacting at a temperature between about 10° and 60° C. said crude DMT with between about 1 and 10 parts by weight of liquid methanol per part of said crude DMT whereby said crude DMT forms a slurry in said liquid methanol, for a time of at least about 5 minutes such that the acid number of the contacted DMT is substantially reduced, filtering solid DMT of lowered acid number from a liquid methanol solution, distilling said filtered DMT to recover a distilled DMT fraction characterized by an acid number of not more than about 0.05 and a melting point of about 140.62° C.

2. The process of claim 1 wherein said methanol usage is between about 2 and 6 parts by weight per part of crude DMT.

3. A process for preparing extremely high purity dimethylterephthalate from crude dimethylterephthalate having an acid number between 0.1 and about 25 which process comprises (1) distilling said crude DMT to obtain a distilled crude DMT fraction having an acid number in excess of 0.1 and a distilled DMT fraction characterized by an acid number of not more than about 0.05 and a melting point of about 140.62° C., (2) contacting at a temperature between about 50° and 60° C. said distilled crude DMT with between about 2 and 10 parts by weight of liquid methanol per part of said distilled crude DMT whereby said distilled crude DMT forms a slurry in said liquid methanol for a time of at least about 10 minutes such that the solid DMT recovered from said slurry has an acid number of not more than about 0.05, (3) filtering solid DMT from a liquid methanol solution, and (4) recovering adhering methanol from said solid DMT to obtain a DMT product characterised by an acid number of not more than about 0.05 and a melting point of about 140.62° C.

4. The process of claim 3 wherein said methanol usage is between about 3 and 6 parts by weight per part of distilled crude DMT.

References Cited in the file of this patent

UNITED STATES PATENTS

| | | |
|---|---|---|
| 2,459,014 | Cavanaugh et al. | Jan. 11, 1949 |
| 2,773,090 | Leibu | Dec. 4, 1956 |

FOREIGN PATENTS

| | | |
|---|---|---|
| 1,119,564 | France | Apr. 3, 1956 |